United States Patent [19]

Stevens

[11] Patent Number: 4,483,078
[45] Date of Patent: Nov. 20, 1984

[54] INNER DIAMETER AND BORE GAUGE

[75] Inventor: Kenneth V. Stevens, Coffeyville, Kans.

[73] Assignee: Cooper Industries, Inc., Houston, Tex.

[21] Appl. No.: 418,445

[22] Filed: Sep. 15, 1982

[51] Int. Cl.³ .............................................. G01B 5/12
[52] U.S. Cl. ................................ 33/148 R; 33/178 R
[58] Field of Search ............ 33/178 R, 147 F, 147 R, 33/148 R, 148 E, 148 F, 147 H, 147 K, 143 R

[56] References Cited

U.S. PATENT DOCUMENTS

| | | |
|---|---|---|
| 1,511,624 | 10/1924 | McGuckin . |
| 1,591,259 | 7/1926 | Ames . |
| 2,335,775 | 11/1943 | Laughton ......................... 33/178 R |
| 2,418,595 | 4/1947 | Muller . |
| 2,429,511 | 10/1947 | Emery ............................. 33/178 R |
| 2,558,291 | 6/1951 | Eisele . |
| 2,771,687 | 11/1956 | Hutto . |
| 3,081,548 | 3/1963 | Schwartz . |
| 3,475,826 | 11/1969 | De Hart et al. . |
| 3,995,374 | 12/1976 | Fisk . |
| 4,397,092 | 8/1983 | Marcyan ........................... 33/178 R |

Primary Examiner—William D. Martin, Jr.
Attorney, Agent, or Firm—Fraser, Barker, Purdue & Clemens

[57] ABSTRACT

A simple and inexpensive apparatus for rapidly measuring the inside diameter of a bore includes an elongated cylindrical tube which has a first pair of diametrically opposed tapered slots formed in one end thereof. A second pair of diametrically opposed slots of uniform width are formed in the other end of the tube, oriented perpendicularly to the first pair of tapered slots. A linear translation indicating device such as a dial indicator is provided to measure the distance between the opposing sides of the one end of the tube. A pair of extension arms are secured to the other end of the tube. By pressing the opposing sides of the one end of the tube together, the opposing sides of the other end of the tube will move inwardly such that the bore gauge and particularly the extension arms can be inserted into a bore to be measured. When released, the opposing sides of both ends of the tube will expand outwardly until the outer faces of the extension arms contact the inside wall of the bore to be measured. When calibrated to the known diameter of a master ring, the dial indicator will indicate the deviation from the diameter of the master ring.

20 Claims, 3 Drawing Figures

INNER DIAMETER AND BORE GAUGE

BACKGROUND OF THE INVENTION

1. Field of the Invention

The present invention relates in general to bore gauges and in particular to an apparatus for measuring the inner diameter of bores.

2. Description of the Prior Art

In the machining of precision parts, it is often necessary to measure the inner diameter of a machined bore in order to determine when the part has been machined to its finished dimensions. Many devices are known in the art for achieving this inner diameter measurement. For example, U.S. Pat. No. 3,081,548 to Schwartz discloses a bore gauge utilizing a pair of caliper arms which move arcuately with respect to the axis of the gauge. An actuating means causes a dial indicator to indicate the longitudinal displacement between the caliper arms and the calibrations on the gauge, which displacement is related to the inner diameter of the bore. Other bore gauge devices are described in U.S. Pat. Nos. 1,511,624 to McGuckin, 2,558,291 to Eisele, 2,771,687 to Hutto, Jr., and 3,995,374 to Fisk.

U.S. Pat. No. 1,591,259 to Ames discloses a tool for setting or checking measuring instruments, such as cylinder gauges, for predetermined sizes. The setting tool includes a dial indicator which is calibrated between adjustable and accurately positionable fingers by a plurality of spacing members such that the distance between the fingers is exactly equal to the diameter of the bore to be measured. A cylinder gauge is then positioned between the fingers and adjusted so that the indicating hand of the dial indicator will register zero. When the cylinder gauge is inserted in the bore of a cylinder to be measured, the dial of the indicator dial will show the amount of over or under size in the cylinder as compared to the distance between the fingers of the setting tool.

SUMMARY OF THE INVENTION

The present invention relates to an apparatus for measuring the inner diameter of bores. An elongate cylindrical tube has a first pair of diametrically opposed tapered slots formed in one end thereof. A second pair of diametrically opposed slots are formed in the other end of the tube, oriented perpendicularly to the first pair of slots. Each of the second pair of slots are of uniform width and extend a shorter distance into the tube than the pair of tapered slots. A dial indicator is secured to one wall of the tube in a radial orientation and indicates the diametral separation of the walls of the tube in the region proximate the first pair of slots. A pair of extension arms are secured in respective threaded apertures formed in the other end of the tube and extend generally along opposed radial axes spaced 90° from the adjacent, second pair of slots. The outer ends of the extension arm are rounded off to contact the inside wall of a bore to be measured. To utilize the bore gauge, the one end of the tube having the tapered slot formed therein is squeezed such that the opposing sides of the tube defined by the tapered pair of slots move toward one another. The closing movement of the one end of the tube causes the other end of the tube having the pair of uniform width slots to be similarly closed. The bore gauge is then inserted into a master ring having a known diameter and released, causing the extension arms to move outwardly into contact with the inner wall of the ring. The dial indicator is then calibrated by, for example, resetting it to zero. The bore gauge is then again squeezed, removed from the master ring and positioned within a bore to be measured. Release of the tube causes the arms to again expand and contact the inner wall of the bore. The dial indicator then indicates the deviation of the measured bore from the master ring.

It is an object of the present invention to provide a gauge for measuring the inner diameter of bores.

It is a further object of the present invention to provide an improved bore gauge which is simple in construction and operation.

It is a still further object of the instant invention to provide a bore measuring gauge which indicates deviation from a known diameter bore.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
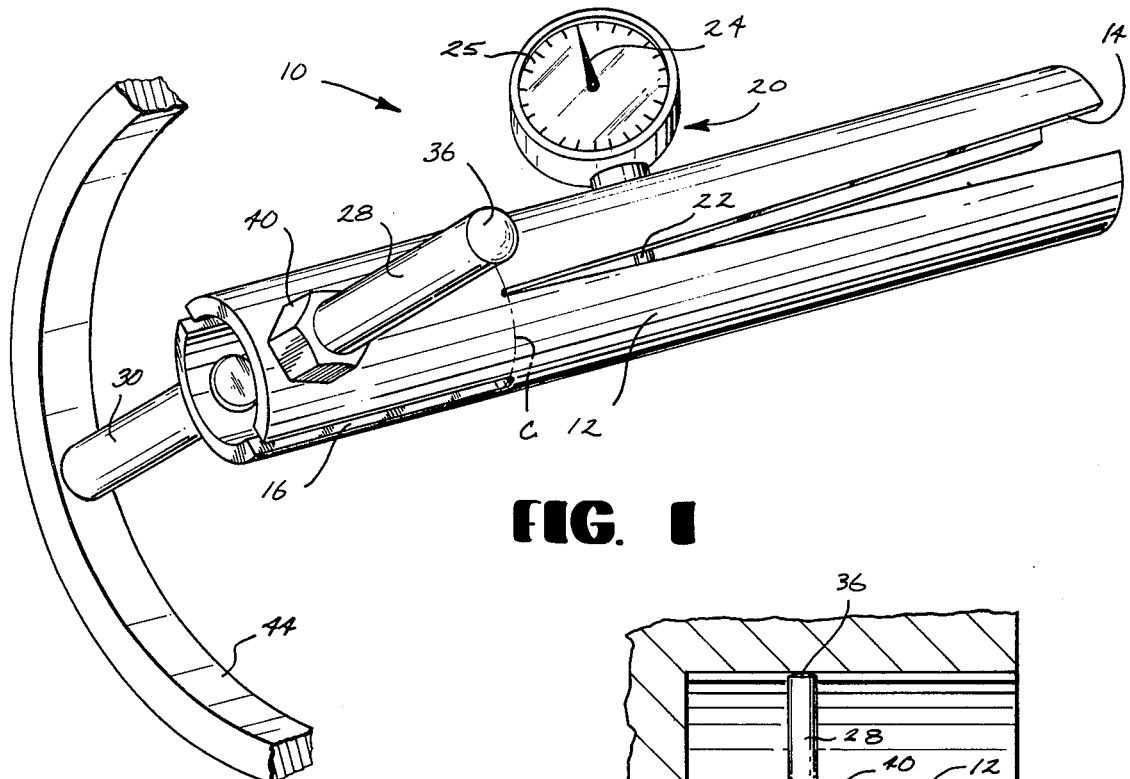
FIG. 1 is a perspective view of an inner diameter and bore gauge in accordance with the present invention.
Figure 2:
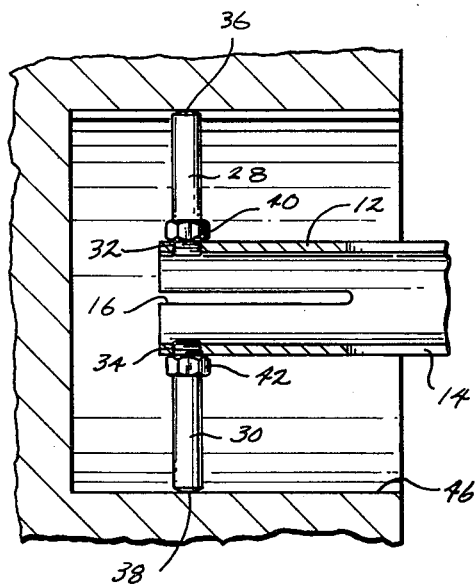
FIG. 2 is a sectional elevational view of one end of the bore gauge of FIG. 1 inserted within a bore.
Figure 3:
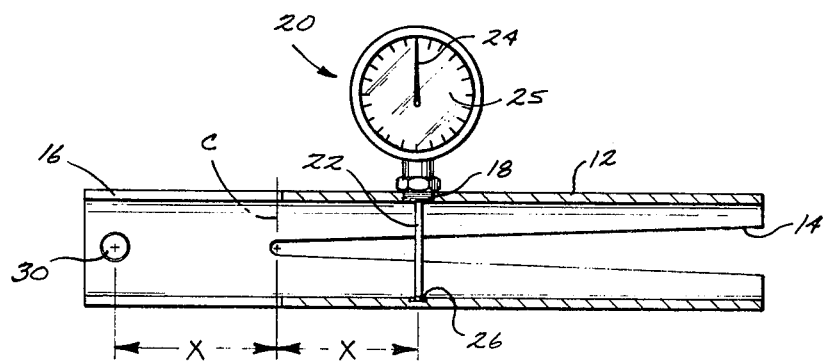
FIG. 3 is a sectional elevational view of the other end of the bore gauge of FIG. 1.

Referring now to the drawings, there is illustrated in FIG. 1 an inner diameter and bore gauge 10 in accordance with the present invention. The gauge 10 includes an elongated cylindrical tube 12 having a first pair of opposed tapered slots 14 formed in one end thereof. The pair of tapered slots 14 are preferably diametrically opposed and extend axially along a relatively long portion of the tube 12. A second pair of diametrically opposed slots 16 are formed in the other end of the tube 12, as shown more clearly in FIG. 2. The second pair of slots 16 have a uniform width and extend axially along a relatively short portion of the tube 12. Preferably, the second pair of slots 16 are formed along a diameter of the tube 12 which is perpendicular to the diameter of the first pair of tapered slots 14. The ends of the slots 14 and 16 are also disposed in substantial coincidence about a common circumference "C" as seen in FIGS. 1 and 3.

Although any size may be used, it has been found convenient to utilize a tube 12 formed of grade 4340 steel and having a length of 7.0 inches and inner and outer diameters of 0.875 inches and 1.25 inches, respectively. The pair of tapered slots 14 can be formed symmetrically through a diameter of the tube 12 at an angle of 4° and extend 5.0 inches axially therealong. The second slot 16 can be formed at a uniform width of 0.125 inches and extends 2.0 inches axially along the tube 12.

A threaded aperture 18 is formed in the tube 12 to receive a linear translation indicating means, such as a plunger-type dial indicator indicated generally at 20. The aperture 18 is preferably formed near the middle of the tube 12 and extends radially through the wall thereof. The dial indicator 20 is a conventional device in the art in which translation of an elongate plunger 22 is converted into rotary movement of a dial indicator pointer 24. The dial indicator also includes a calibrated, resettable scale 25. The plunger 22 extends through the aperture 18 and contacts a small radially aligned recessed surface 26 formed in the inside wall of the tube 12, as shown in FIG. 3. The recessed surface 26 is provided to receive the plunger 22 of the indicator 20 at a point on the tube 12 diametrically opposite the aperture 18, thereby increasing the accuracy of the dial indicator 20.

A pair of extension arms 28 and 30 are secured in respective threaded apertures 32 and 34 formed in the other end of the tube. The centers of each of the apertures are disposed an axial distance "X" from the circumference line of slot ends "C" equal to the distance "X" from the line "C" to the center of the aperture 18 as shown in FIG. 3. Each extension arm 28 and 30 has a threaded end portion for cooperating with the respective one of the apertures 32 and 34. The arms 28 and 30 have respective outer faces 36 and 38 which can be rounded off to contact the inside wall of a bore to be measured. The distance separating the outer faces 36 and 38 of the extension arms 28 and 30 can be adjusted by selecting from an assortment of various length arms (not illustrated) and by rotating the arms 28 and 30 within the apertures 32 and 34. When the desired distance of separation has been reached, a pair of lock nuts 40 and 42 can be utilized to respectively secure the extension arms 28 and 30 in position.

To utilize the bore gauge 10, the opposing sides of the one end of the tube 12 defined by the tapered slot 14 are pressed together, by suitable means, such that relative closing movement of the opposing sides is effected. The closing movement of the opposing sides of the one end of the tube 12 causes similar closing movement of the opposing sides of the other end of the tube 12. Consequently, the distance separating the outer faces 36 and 38 of the extension arms 28 and 30 is reduced.

While the opposing sides of the one end of the tube 12 are pressed together, the bore gauge 10 is inserted within a master ring 44 having a bore known to be of a desired standard diameter against which the bore 46 of articles will be compared. The opposing sides of the one end of the tube 12 are then released, causing relative opening movement of both ends of the tube 12. Such opening movement continues until the outer faces 36 and 38 of the extension arms 28 and 30 contact the inner wall of the master ring 44. Preferably, the dial indicator 20 is calibrated to display a zero reading for the master ring 44 diameter by resetting the scale 25 to zero.

After the dial indicator 20 has been calibrated for the master ring 44, the opposing sides of the one end of the tube 12 are again pressed together such that the outer faces 36 and 38 are moved inwardly from the inside wall of the master ring 44. The bore gauge 10 is removed from the master ring 44 and inserted in a bore 46 of an article to be measured. The opposing sides of the one end of the tube 12 are then released, allowing the outer faces 36 and 38 of the extension arms 28 and 30 to move into contact with the inside wall of the bore 46 to be measured. The pointer 24 of the dial indicator 20 will indicate a value relating the diameter of the measured bore 46 to the diameter of the master ring 44. If positive (clockwise from zero), the measurement value must be subtracted from the master ring 44 diameter and, if negative (counterclockwise from zero), it must be added.

It will be appreciated that the opening and closing movement of the opposing sides of the one end of the tube 12 causes the plunger 22 to move longitudinally inwardly and outwardly with respect to the dial indicator 20, causing the pointer 24 to rotate around the scale 25. Since the total motion between the opposing sides of the one end of the tube 12 at the location of the dial indicator 20 is equal to the total motion between the opposing sides of the other end of the tube 12 at the locations of the arms 28 and 30 and the total motion of the outer faces 36 and 38 of the extension arms 28 and 30, the pointer 24 of the dial indicator 20 will display a measurement equal to the motion of the arms 28 and 30. Thus, once the gauge 10 and more particularly the indicator 20 has been calibrated to a given (master ring) diameter, the dial indicator 20 will directly provide actual dimensional variation from the given diameter.

It can be seen that the bore gauge 10 of the present invention provides a simple and inexpensive apparatus for accurately measuring the inside diameters of bores. Little or no maintenance is required to keep the apparatus in an operating condition. Furthermore, repairs to the bore gauge 10 can be effected quickly. Finally, it can be seen that the bore gauge 10 can be used very rapidly to measure the bores and inside diameters of many articles.

In accordance with the provisions of the patent statutes, the principle and mode of operation of the present invention have been explained and illustrated in its preferred embodiment. However, it must be appreciated that the present invention can be utilized otherwise than as specifically explained and illustrated without departing from its spirit or scope.

What is claimed is:

1. An apparatus for measuring the diameter of a bore comprising:
    an elongated cylindrical tube, said tube having a first slot means formed in one end thereof for defining first opposed sides and a second slot means formed in the other end thereof for defining second opposed sides, said second slot means being oriented with respect to said first slot means such that opening and closing movement of said first opposed sides causes respective opening and closing movement of said second opposed sides;
    indicator means connected to said tube for measuring the distance between said first opposed sides; and
    extension means secured to said second opposed sides for contacting the inside wall of the bore to be measured.

2. An apparatus in accordance with claim 1 wherein said first slot means includes a first pair of opposed slots formed through a diameter of said tube and extending axially along a major portion thereof.

3. An apparatus in accordance with claim 2 wherein said first pair of opposed slots are tapered.

4. An apparatus in accordance with claim 1 wherein said second slot means includes a second pair of opposed slots formed through a diameter of said tube and extending axially along a minor portion thereof.

5. An apparatus in accordance with claim 4 wherein said second slot means includes a pair of uniform width slots.

6. An apparatus in accordance with claim 1 wherein said indicator means is a dial indicator secured to one of said first opposed sides, said dial indicator including longitudinally movable plunger means extending through an aperture formed in said one of said first opposed sides into contact with the other of said first opposed side.

7. An apparatus in accordance with claim 1 wherein said extension means includes a pair of extension arms, each extension arm being threadably secured into a respective threaded aperture formed in a respective one of each of said second opposed sides of said tube.

8. An apparatus in accordance with claim 7 wherein said extension means further includes lock nut means for locking the extension arms in a desired position.

9. An apparatus for measuring the diameter of a bore comprising:

an elongated cylindrical tube, said tube having a first slot means formed in one end thereof for defining first opposed sides and a second slot means formed in the other end thereof for defining second opposed sides, said second slot means being oriented perpendicularly to said first slot means;

indicator means connected to said tube for measuring the distance between said first opposed sides; and extension means secured to said second opposed sides, said extension means having outer faces for contacting the inside wall of the bore to be measured, whereby dimensional changes between the opposing sides of the one end of the tube are proportional to dimensional changes between said outer face of said extension means.

10. An apparatus in accordance with claim 9 wherein said first slot means includes a first pair of opposed slots formed through a diameter of said tube and extending axially along a major portion thereof.

11. An apparatus in accordance with claim 10 wherein said first pair of opposed slots are tapered.

12. An apparatus in accordance with claim 9 wherein said second slot means includes a second pair of opposed slots formed through a diameter of said tube and extending axially along a minor portion thereof.

13. An apparatus in accordance with claim 12 wherein said second pair of opposed slots are uniform in width.

14. An apparatus in accordance with claim 9 wherein said indicator means is a dial indicator, secured to one of said first opposed sides, said dial indicator including longitudinally movable plunger means extending through an aperture formed in said one of said first opposed sides into contact with the other of said first opposed sides.

15. An apparatus in accordance with claim 9 wherein said extension means includes a pair of extension arms, each extension arm being threadably secured to a respective threaded aperture formed in a respective one of each of said second opposed sides of said tube.

16. An apparatus in accordance with claim 15 wherein said extension means further includes lock nut means for locking the extension arms in a desired position.

17. An apparatus for measuring the diameter of a bore comprising, in combination, an elongated cylindrical tube, said tube having a first pair of slots formed in one end thereof and defining first opposed sides and a second pair of slots formed in the other end thereof and defining second opposed sides, said second pair of slots being substantially oriented perpendicularly to said first pair of slots, said first and said second pairs of slots having ends, said ends disposed in substantial coincidence about a common circumference;

indicator means connected to said tube for measuring the distance between said first opposed sides; and extension means secured to said second opposed sides, said extension means having outer faces for contacting the wall of the bore to be measured.

18. An apparatus in accordance with claim 17 wherein said first pair of slots are formed through a diameter of said tube and extend axially along a major portion thereof.

19. An apparatus in accordance with claim 17 wherein said second pair of slots are formed through a diameter of said tube and extending axially along a minor portion thereof.

20. An apparatus in accordance with claim 17 wherein said indicator means is a dial indicator secured to one of said first opposed sides, said dial indicator including longitudinally movable plunger means extending through an aperture formed in said one of said first opposed sides into contact with the other of said first opposed sides.

* * * * *